United States Patent [19]
D'Alterio

[11] Patent Number: 6,024,258
[45] Date of Patent: Feb. 15, 2000

[54] MATERIAL CONTAINER THAT SHUTTLES BETWEEN SUPPLY AND USE SITES

[75] Inventor: Joseph C. D'Alterio, Glen Cove, N.Y.

[73] Assignee: SBJR Restaurants Inc., River Vale, N.J.

[21] Appl. No.: 09/336,514

[22] Filed: Jun. 18, 1999

[51] Int. Cl.[7] .................................................. G01F 11/10
[52] U.S. Cl. ........................... 222/361; 222/450; 222/235
[58] Field of Search ................................ 222/185.1, 217, 222/361, 412, 444, 450, 453, 561, 559, 334, 235

[56] References Cited

U.S. PATENT DOCUMENTS

| | | | |
|---|---|---|---|
| 4,060,183 | 11/1977 | Puurunen | 222/450 X |
| 4,378,897 | 4/1983 | Kattlemann | 222/450 X |
| 4,678,015 | 7/1987 | Raque et al. | 222/361 X |
| 5,613,626 | 3/1997 | Firey | 222/334 X |

*Primary Examiner*—Kevin Shaver
*Assistant Examiner*—Thach Bui
*Attorney, Agent, or Firm*—Paul W. Garbo

[57] ABSTRACT

An apparatus for repetitively conveying a measured volume of loose material from a supply hopper and discharging the material at a selected site has a shuttle with a cavity for holding the material. The bottom of the cavity is a slide plate or a pair of slide plates that are retracted to discharge the contents of the cavity. Rapid retraction of the plate or plates is effected by mechanical means such as pneumatic pistons which are reversible to close the bottom of the cavity. The shuttle is moved reciprocatingly on a track extending between the supply and discharge sites by mechanical means such as pneumatic pistons. The shuttling apparatus is preferably combined with a supply hopper having a discharge gate in the form of slide plates like those at the bottom of the cavity.

15 Claims, 3 Drawing Sheets

MATERIAL CONTAINER THAT SHUTTLES BETWEEN SUPPLY AND USE SITES

BACKGROUND OF THE INVENTION

This invention relates to shuttle means for receiving a measured quantity of flowable material from a supply source, transferring that quantity of material to a use site, and discharging it there before returning to the supply source to begin the cycle again. More specifically, the invention involves a cup that is filled with flowable material from a supply bin, is transported to a use site where the contents of the cup are deposited before the cup is returned to the supply bin for refilling and repeating the shuttle movement.

The apparatus of the invention is particularly useful in a system such as that disclosed in pending application Ser. No. 09/161,638 of D'Alterio involving the hot molding of a measured volume of cooked, cut spaghetti into a pizza-like shell. The novel apparatus makes it possible to move a measured volume of spaghetti from a hopper filled with cooked spaghetti to the mold of the aforesaid D'Alterio application, deposit that volume of spaghetti in the mold and return to the hopper without interfering with the movements of the molding system.

No prior art pertinent to this invention is known. U.S. Pat. No. 4,440,322 to Henry proposes a dispenser for nuts which has a movable slide that transfers a measured volume of nuts from the bottom of a hopper to a delivery chute. The hopper, slide and chute of Henry may serve as a dispenser of nuts in a retail shop but is useless in a manufacturing system where Henry's structure would obstruct movements of that system.

Accordingly, a principal object of this invention is to provide means for transporting a measured volume of flowable material from a supply container to a use site where the measured material is discharged, and thereupon the means are returned to the supply container.

Another important object is to provide apparatus especially suitable for handling wet stringy materials such as cooked spaghetti.

These and other features and advantages of the invention will be apparent from the description which follows.

SUMMARY OF THE INVENTION

The apparatus of this invention comprises a shuttle containing a cavity or cup of a desired capacity, which carries the cup from the discharge opening of a supply bin or hopper containing flowable particulate material, after the cup is full, to a selected place where the cup is emptied and whence the shuttle returns the cup to the discharge opening of the supply bin for refilling.

An essential feature of the cup of the invention is its bottom that is entirely retractable in the form of a slide plate that can be withdrawn so that the contents of the cup drop out completely and quickly. Preferably, the bottom is in the form of a pair of slide plates that abut or overlap one another in the closed position and are retracted in opposite directions in the open position. By withdrawing the paired plates in opposite directions the particulate contents of the cup drop down instantly and more nearly en masse, particularly when the material is sticky.

Related to the feature that the bottom of the measuring cup can be withdrawn to ensure complete discharge of the contents, is the feature of mechanical means that cause instantaneous movement of the bottom slide or paired slide plates. Known means for effecting instantaneous movement include magnetic, hydraulic and pneumatic devices. Generally, pneumatic pistons are preferred because of simplicity and low cost. The same types of drive or movement devices can be used to move the shuttle back and forth.

The shuttle moves on a track that extends between the material supply source and the material delivery site. The track may be in any of the many known types such as metal rails or tubes on which rollers or low-friction slide bearings travel. The rollers or other types of rail followers are attached to the shuttle at its sides or bottom or even top if the rail followers are of suspension type.

In an important use of the shuttle of the invention, the shuttle is combined with a hopper arranged to fill the cup of the shuttle with a wet, sticky material such as cut pieces of cooked spaghetti mixed with a fluid binding agent. In such case, the closure at the bottom aperture of the hopper is preferably like that at the bottom of the cup in the shuttle.

While the apparatus of the invention can be operated manually or by manual activation of drive devices such as pneumatic pistons, it is ideally suited for automatic industrial operation by having any known timing device connected to cause the desired sequential movements of all the slide plates and the shuttle repetitively.

BRIEF DESCRIPTION OF THE DRAWINGS

To facilitate the further description and understanding of the invention, reference will be made to the accompanying drawings of which.

DESCRIPTION OF A PREFERRED EMBODIMENT

Figure 1:
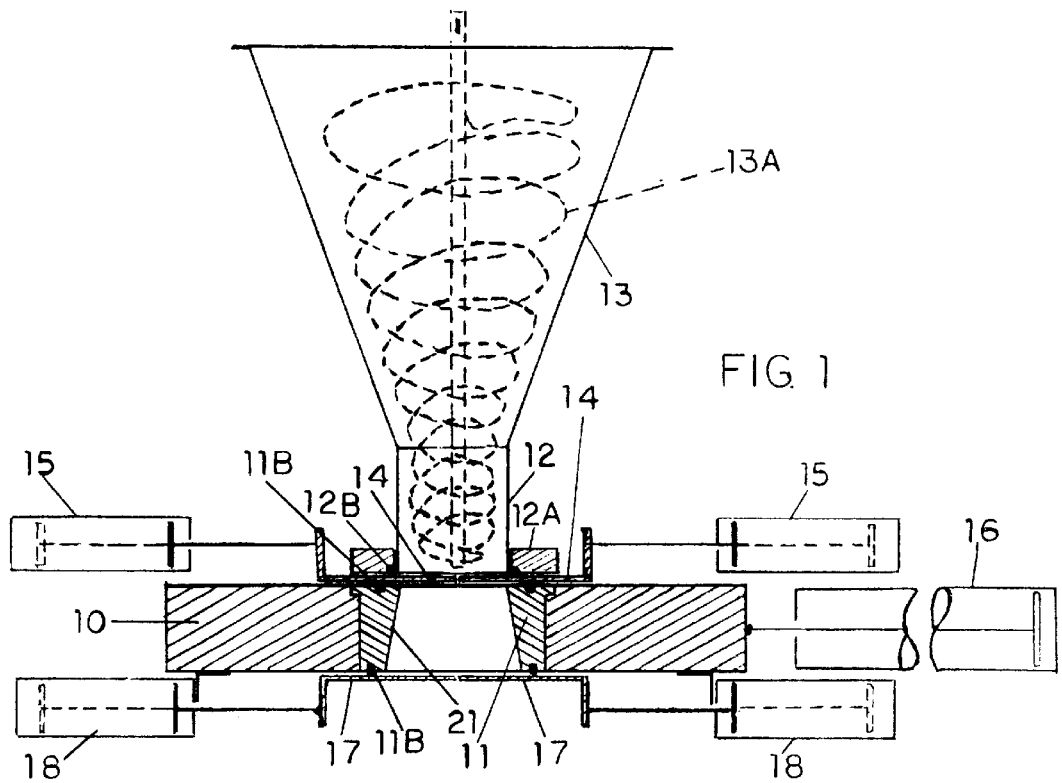
FIG. 1 is a diagrammatic sectional elevation of the apparatus of the invention positioned under the discharge opening of a supply hopper.

The shuttle apparatus of the invention for transferring a selected volume of flowable material from a supply source to a designated discharge site is shown in section under a feed hopper by FIG. 1. Shuttle 10 has cavity or cup 11 of a desired volumetric capacity. As shown, when shuttle 10 is in a position for filling cup 11, the top opening of cup 11 is aligned with discharge neck 12 of hopper 13. In that position, the gate at the end of neck 12 can be opened so that material drops into cup 11. Feed hoppers are available with various types of gates or valves. FIG. 1 shows a preferred gate in the form of two abutted slide plates 14 which can be pulled apart by pneumatic pistons 15. As soon as cup 11 is filled, pistons 15 push slides 14 together again and shuttle 10 is ready to be pushed by pneumatic piston 16.

At the end of the stroke of piston 16, cup 11 is directly over the place where the contents of cup 11 are to be deposited. Thereupon, the bottom of cup 11 which is in the form of two abutted slide plates 17 vanishes, i.e., plates 17 are pulled apart by pneumatic pistons 18, and the material in cup 11 drops down on the selected spot. Pistons 18 then push plates 17 together while piston 16 pulls shuttle 10 back so that cup 11 is again aligned with discharge neck 12 of hopper 13 and slide plates 14 can be pulled apart by activating pistons 15 to repeat the cycle of movements.

When hopper 13 holds wet solids, the bottom of hopper neck 12 is preferably provided with a ring or collar 12A having a flat bottom surface adjacent to the top face of slide plates 14. Collar 12A holds an O-ring 12B around the bottom end of neck 12 to squeegee fluid from plates 14 when pulled apart. Similarly, the top and bottom openings of cup 11 can be provided with O-rings 11B. Plates 14 as well as 17 are preferably formed of stainless steel, and cup 11 is preferably made of aluminum.

It is also preferred to provide an auger-like stirrer in hopper 13 to promote uniform, positive flow of wet particulate matter down into and through neck 12. Phantom (dotted) line 13A represents such a stirrer in hopper 13.

Figure 2:
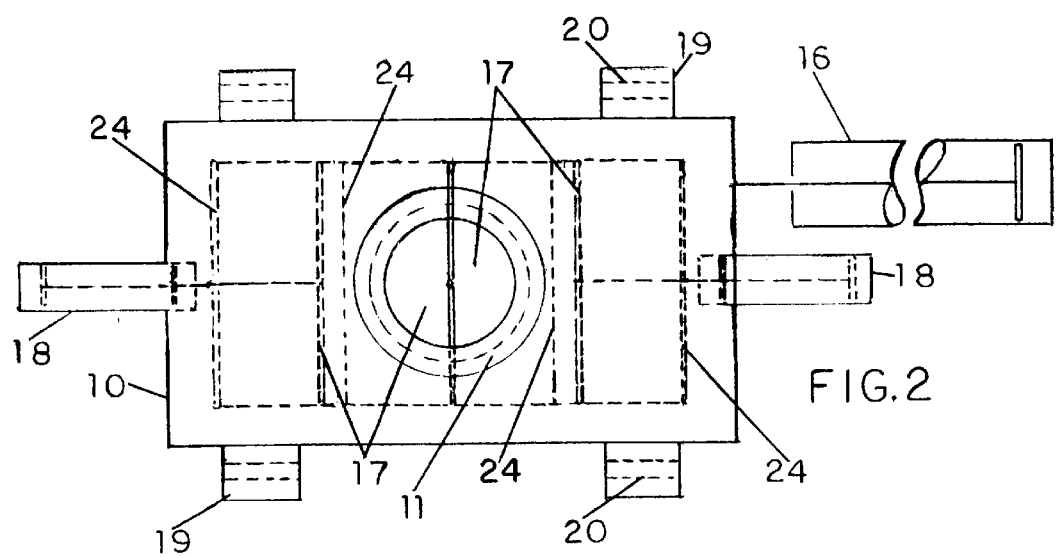
FIG. 2 is a plan view of the shuttle which travels horizontally from the hopper to a selected delivery point.
Figure 3:
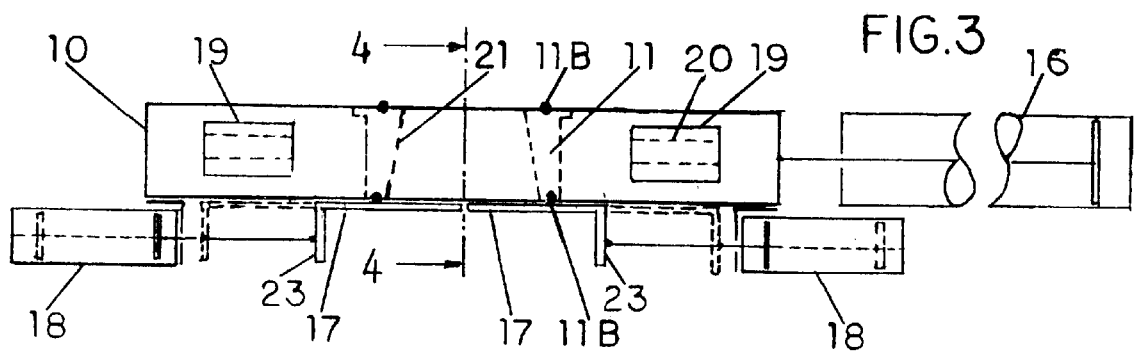
FIG. 3 is a front elevation of the shuttle of FIG. 2.
Figure 4:
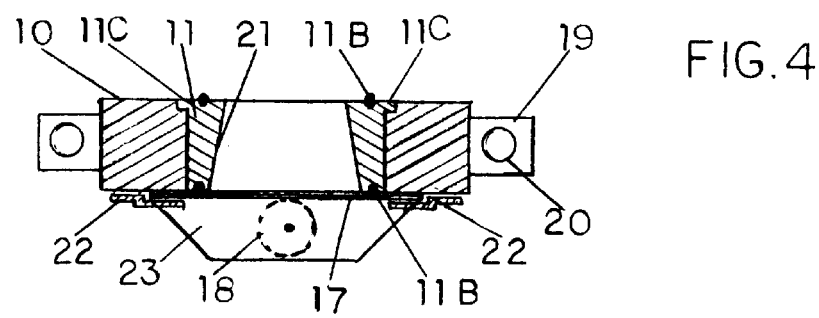
FIG. 4 is a sectional view of the shuttle taken along the like 4—4 of FIG. 3.

FIGS. 2 to 4 show shuttle 10 with four lateral brackets 19, each holding a linear bearing 20. Not shown is a tubular rail that is fitted through the two linear roller bearings or plastic bushings 20 on each side of shuttle 10. Of course, the pair of tubular rails extend from hopper 13 to the site where cup 11 is emptied and the ends of the rails are fastened in fixed positions. Other forms of rails can be substituted such as railroad-type rails for wheels. The pair of pistons 18 which open and close slide plates 17 are fastened to the bottom of shuttle 10 and travel therewith. Piston 16 which moves shuttle 10 is appropriately anchored at a place where it can effect reciprocation of shuttle 10 between filling and emptying positions of cup 11. Pistons 15 are also anchored in relation to hopper neck 12 to open and close plates 14.

The lateral wall 21 of cup 11 is preferably slightly tapered so that the bottom opening is larger than the top opening. This ensures prompt and full discharge of the contents of cup 11 when plates 17 are pulled apart. Slide plates 17 are supported against the bottom of shuttle 10 by a pair of clamp-guide strips 22 fastened on the bottom of shuttle 10. Each plate 17 has a small plate or tab 23 attached along the edge opposite the abutted edge. Tab 23 provides the place for connecting the rod of piston 18 to plate 17. FIG. 2 shows slide plates 17 in the closed or abutted position and dotted lines 24 indicate the positions of the front and back edges of plates 17 when fully retracted by pistons 18.

As best seen in FIG. 4, cup 11 is provided with a top outer lip 11C that fits into a matching groove in shuttle 10. Lip 10 obviously prevents cup 11 from dropping out of shuttle 10. However, there are other ways of holding cup 11 in shuttle 10. For example, the outer shape of cup 11 may be a frustum, i.e., tapered or slanted oppositely to slanted wall 21 of cup 11. Plugs or keys between cup 11 and shuttle 10 are other examples of known means of keeping cup 11 securely in shuttle 10. Shuttle 10 basically does not need a separable cup 11; shuttle 10 can be bored out of shuttle slab 10 to provide the desired capacity for the material to be transported from a supply source to a delivery spot. However, a separable cup is preferred not only because it permits the use of different materials for the cup and shuttle but also the cup may be easily replaced with a cup having a different capacity that may be desired from time to time.

Figure 5:
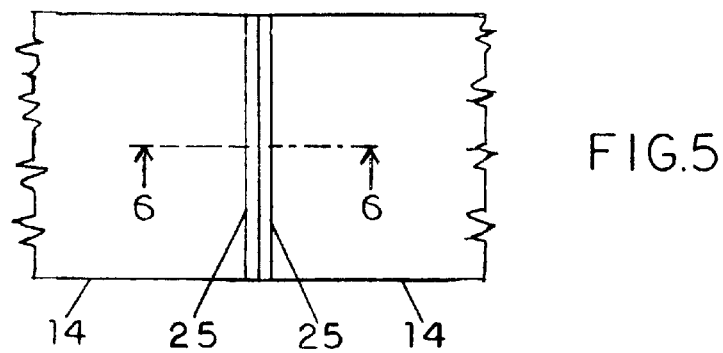
FIG. 5 is an enlarged plan view of the portion of slides that come together to cut off the flow of material from the supply hopper.
Figure 6:
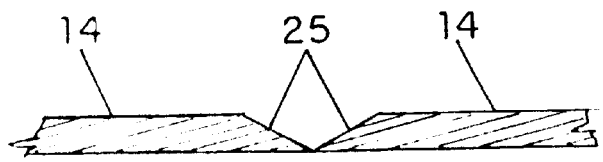
FIG. 6 is a further enlarged sectional view of the slides of FIG. 5 taken along the line 6—6.

FIG. 5 is a partial plan view of slide plates 14 in the closed or abutted position. The leading edge of each plate 14 is preferably tapered to a knife edge 25. FIG. 6 shows the abutted knife edges 25 in cross section. Sharp edges 25 are preferred for cutting through pieces of material like short pieces of spaghetti.

Figure 7:
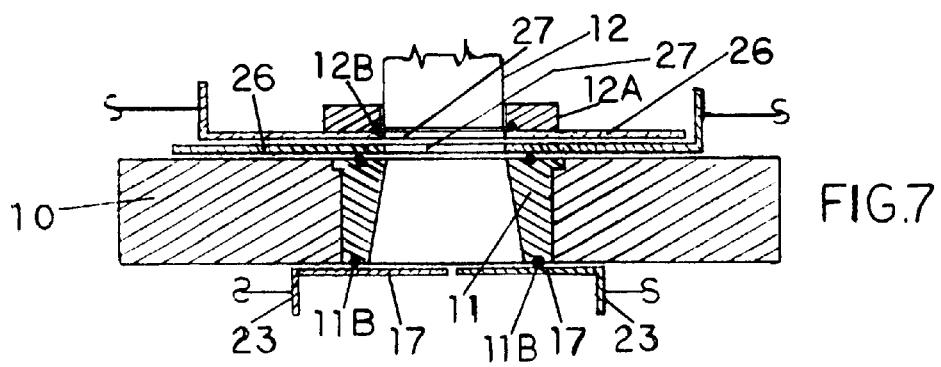
FIG. 7 is a partial view of FIG. 1 showing alternative slides for controlling the flow of material from the hopper while in the open position.
Figure 8:
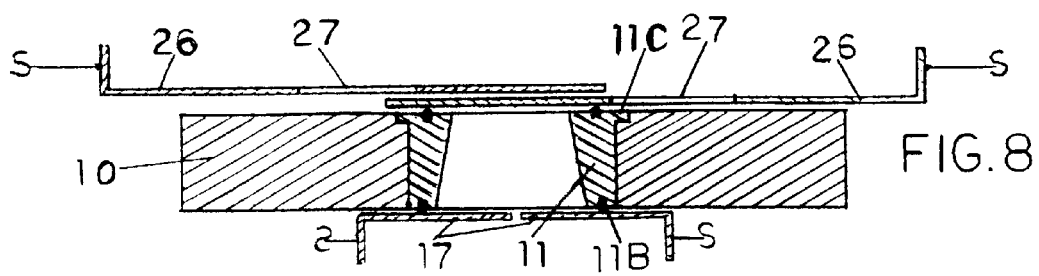
FIG. 8 is like FIG. 7 but shows the slides in the closed position.
Figure 9:
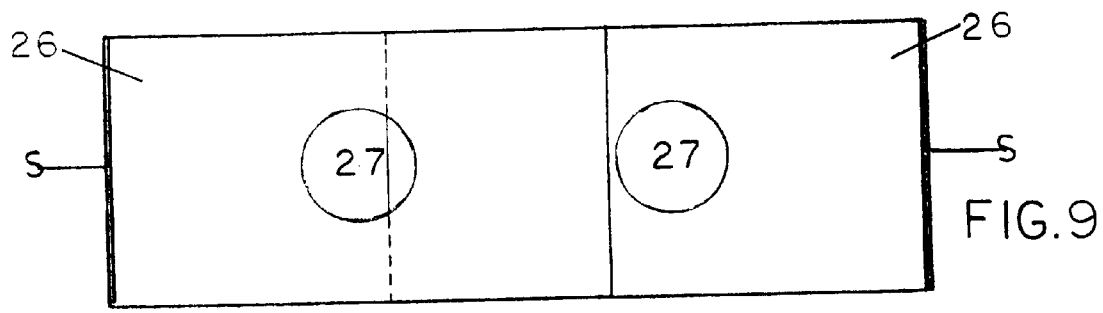
FIG. 9 is a plan view of the slides in FIG. 8.

FIG. 7 differs from FIG. 1 only in the gate at the bottom end of hopper neck 12. A pair of overlaid slide plates 26 with circular apertures 27 have replaced plates 14 used in FIG. 1. Apertures 27 have the same size as the bottom opening of hopper neck 12 so that when plates 26 are positioned with their apertures 27 aligned with the open bottom of neck 12, material will flow freely from neck 12 through the apertures 27 of overlaid plates 26 into cup 11. As soon as cup 11 is filled, plates 26 are pulled in opposite directions enough to move their apertures away from hopper neck 12 and thus seal the open bottom of neck 12 with the solid portion of top plate 26 as shown in FIG. 8. FIG. 9 is a top view of plates 26 as positioned in FIG. 8 to seal the bottom end of hopper neck 12. Overlaid plates 26 with apertures 27 which may be elliptical are especially desirable for cutting off the flow of stringy material like spaghetti out of hopper neck 12 because apertures 27 privide scissor-like sheaving as slide plates 26 are pulled in opposite directions.

The apparatus of this invention is particularly valuable in manufacturing operations where a measured quantity of material must be placed within machinery that cannot have fixed means for supplying the material because any such means would obstruct movements of that machinery. The aforementioned pending application Ser. No. 09/161,638 presents such a situation; while the top of a mold is raised, a measured volume of material must be deposited in the bottom of the mold. Obviously, no feeding device can remain over the mold bottom while the mold top comes down to effect molding of the deposited material.

Depending on the configuration of the structure that is to be supplied with measured amounts of loose material, it may be desirable to have shuttle 10 travel at right angles to the direction shown in FIG. 2. In such case, piston 16 would be positioned to have its rod connected to a side of shuttle 10 that has brackets 19 and brackets 19 would be fastened to the opposite ends of shuttle 10 to which pistons 18 are fastened. As previously mentioned, other known guide or runner types may be substituted for linear roller bearings 20 shown in FIG. 2 and the tubular rails (not shown). Also, instead of guides or runners attached to the sides or bottom of shuttle 10, there are known guide systems that are above the thing conveyed. In short, overhead guides that convey shuttle 10 in suspension are alternates for the lateral and tubular rails previously described.

Variations and modifications of the invention will be apparent to those skilled in the art without departing from the spirit or scope of the invention. For example, the shuttle need not be as thick as the depth of the cup; the top of the cup can be above the top surface of the shuttle. Moreover, shuttle 10 need not be a slab of metal or rigid plastic such as nylon; it may be a frame with members for holding cup 11 therein. Pistons 18 can be fastened to the bottom of the frame and brackets 19 can be attached to the sides of the frame. Slide plates like overlaid plates 26 at the bottom of hopper neck 12 may be used in lieu of plates 17 at the bottom of shuttle 10. Overlaid plates 26 are preferably made of dissimilar materials, e.g., one plate 26 of stainless steel and the other plate 26 of nickel-silver bronze. Where one pneumatic piston is shown in the drawings for moving the shuttle or a slide plate, two pistons may be preferred, especially for moving the shuttle. Also, the cup openings need not be circular; other shapes, such as elliptical, oblong or square, may be adopted for different uses of the apparatus of the invention. It is understood that the measured quantity of material deposited in the cup for transport by the shuttle to a designated delivery spot is set by the chosen volumetric capacity of the cup. Accordingly, only such limitations should be imposed on the invention as are set forth in the appended claims.

What is claimed is:

1. An apparatus for repetitively conveying a measured volume of material from a supply source and discharging said material at a selected site, which comprises a shuttle mounted on a track extending from said supply source to said selected site, mechanical means for reciprocatingly moving said shuttle between said supply source and said selected site, a cavity to hold said measured volume of material extending vertically through said shuttle, a slide plate or pair of slide plates forming the bottom of said cavity and being reciprocatingly movable between a position closing the cavity bottom and a position opening said cavity bottom, and mechanical means for reciprocatingly moving said slide plate or pair of slide plates across said cavity bottom.

2. The apparatus of claim 1 wherein the mechanical means for moving the shuttle and for moving the slide plate or pair of slide plates are pneumatic pistons.

3. The apparatus of claim 1 wherein the bottom of the cavity is formed by a pair of abutted slide plates, and the mechanical means for moving said abutted plates apart and together are pneumatic pistons.

4. The apparatus of claim 3 combined with a hopper as the supply source of material, said hopper having a bottom discharge opening with a pair of slide plates disposed across said bottom opening and being reciprocatingly movable to seal and unseal said bottom opening, and mechanical means for reciprocatingly moving said slide plates.

5. The apparatus of claim 4 wherein the pair of slide plates at the bottom opening of the hopper are abutted to seal said bottom opening and are pulled apart to unseal said bottom opening, and the mechanical means for reciprocatingly moving said slide plates are pneumatic pistons.

6. The apparatus of claim 5 wherein the pneumatic pistons are sequentially activated by a timing device.

7. The apparatus of claim 5 wherein the abutted edges of the slide plates are tapered.

8. The apparatus of claim 4 wherein the pair of slide plates at the bottom opening of the hopper are overlaid, each having an aperture substantially like said bottom opening and being alignable therewith to unseal said bottom opening, and the mechanical means for reciprocatingly moving said slide plates are pneumatic pistons that move said slide plates from a position where said apertures are aligned with said bottom opening to a position where said slide plates seal said bottom opening.

9. The apparatus of claim 8 wherein the pair of slide plates at the bottom opening of the hopper are abutted to seal said bottom opening and are pulled apart to unseal said bottom opening, and the mechanical means for reciprocatingly moving said slide plates are pneumatic pistons.

10. The apparatus of claim 9 wherein the abutted edges of the slide plates are tapered.

11. The apparatus of claim 9 wherein the pneumatic pistons are sequentially activated by a timing device.

12. The apparatus of claim 9 wherein the bottom opening of the hopper is surrounded by a flat collar holding an O-ring adjacent said bottom opening.

13. The apparatus of claim 9 wherein the cup holds an O-ring adjacent its top opening and an O-ring adjacent its bottom opening.

14. The apparatus of claim 8 wherein the pair of slide plates at the bottom opening of the hopper are overlaid, each having an aperture substantially like said bottom opening and being alignable therewith to unseal said bottom opening, and the mechanical means for reciprocatingly moving said slide plates are pneumatic pistons that move said slide plates from a position where said apertures are aligned with said bottom opening to a position where said slide plates seal said bottom opening.

15. An apparatus for repetitively conveying a measured volume of material from a hopper and discharging said material at a selected site, which comprises a shuttle mounted on a track extending between said hopper and said selected site, at least one pneumatic piston for reciprocatingly moving said shuttle between said hopper and said selected site, a cup to hold said measured volume of material extending vertically through said shuttle, two abutted slide plates forming the bottom of said cup, oppositely directed pneumatic pistons for alternately pulling said slide plates apart to discharge material from said cup and pushing said slide plates together to form said bottom of said cup, said hopper having a bottom discharge opening with a pair of slide plates disposed across said bottom opening and being reciprocatingly movable to seal and unseal said bottom opening, and mechanical means for reciprocatingly moving said slide plates.

* * * * *

UNITED STATES PATENT AND TRADEMARK OFFICE
CERTIFICATE OF CORRECTION

PATENT NO. : 6,024,258
DATED : February 15, 2000
INVENTOR(S) : Joseph C. D'Alterio It is certified that error appears in the above-identified patent and that said Letters Patent is hereby corrected as shown below:

Claim 9, line 1, change "8" to --15--.

Claim 14, line 1, change "8" to --15--.

Signed and Sealed this

Twelfth Day of December, 2000

Attest:

Q. TODD DICKINSON

Attesting Officer

Director of Patents and Trademarks